Figure 1:
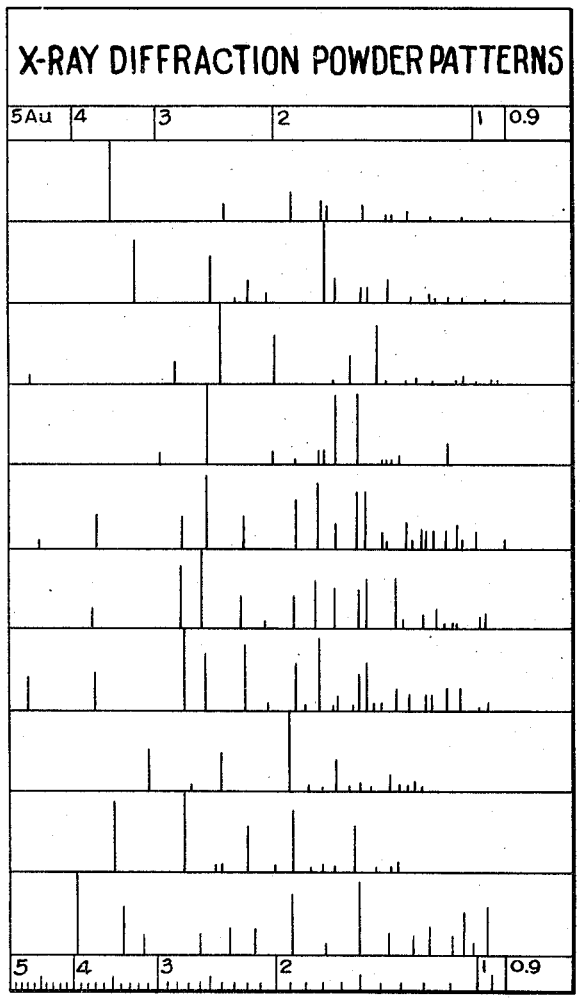

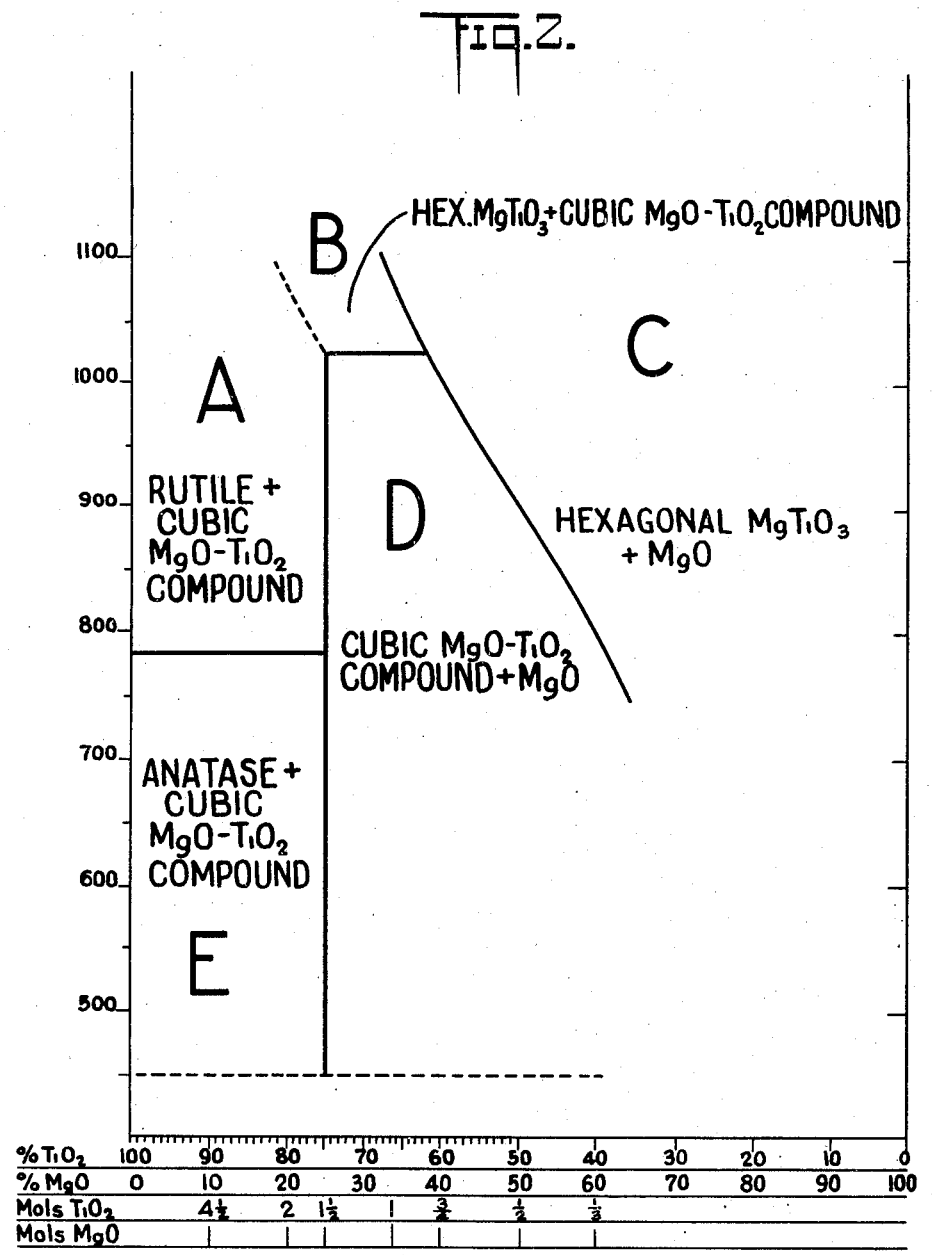

Patented July 2, 1946

2,403,228

UNITED STATES PATENT OFFICE 2,403,228

MAGNESIUM-TITANIUM-OXYGEN COMPOUNDS AND METHODS OF PREPARING THE SAME

Andrew T. McCord and Harold F. Saunders, Haddonfield, N. J., assignors to The Sherwin-Williams Company, Cleveland, Ohio, a company of Ohio Application January 14, 1943, Serial No. 472,302

16 Claims. (Cl. 106—299)

This invention relates to the manufacture of pigments containing titanates. More especially it relates to magnesium titanate and magnesium-titanium compounds associated with titanium dioxide either in solid solution in such magnesium-titanium compounds or free and unbound.

The high hiding or obliterating power of titanium dioxide, particularly when in the pigmentary rutile modification is well known, and titanium dioxide is, therefore, a preferred pigment for white paints of all types where one desires the maximum obliteration of the surface to be covered. In the Todd, Saunders and Verduin Patent 2,326,182, it is disclosed that small amounts, not to exceed 3% by weight of compounds of the metals of group II of the periodic table, and particularly zinc, magnesium and beryllium, favorably affect the transition of anatase to rutile, and permit the use of somewhat lower calcination temperatures and the production of a pigmentary rutile of improved hiding, whiteness and texture. One of the objections to titanium pigments for paint is the tendency for these pigments to chalk out of the paint film when exposed to weather. In tinted paints using titanium dioxide in combination with a coloring pigment, the chalking of the titanium induces a white, dusty surface on the paint film which lightens the apparent tint or color of the paint, and the effect is known as "fading." The titanates, such as zinc titanate or lead titanate, are far superior to titanium dioxide as respects chalk resistance and fading resistance when used with coloring pigments, but lack the superior hiding power of the titanium dioxide.

The addition of a titanate, such as zinc titanate or lead titanate, to paints formulated primarily with titanium dioxide as the principal pigment, has been recommended for the purpose of improving resistance to chalking. In general, it has been found, however, that the proportion of titanate required to effect a satisfactory improvement in the resistance to chalking has been so great that the consequent drop in hiding power and color of the paint is excessive. We have found that when a relatively small amount of a titanate is associated with the titanium dioxide itself during the process of its manufacture, and in the manner hereinafter described, a considerable improvement in chalk resistance is obtained at the expense of only a minor reduction in the hiding power of paints made from such pigment. The color and brightness of the titanium pigment may also be improved by associating with it, in the manner herein described, certain titanium compounds, especially magnesium-titanium compounds.

In our Patent No. 2,379,019, it was disclosed that when hydrous titanium dioxide in the form of $\gamma$-titanic acid was admixed with certain compounds of zinc, and the mixture heated, the products obtained under certain conditions consisted of zinc-titanium compounds of hexagonal crystal symmetry and of the ilmenite structure type, either alone, or associated with titanium dioxide free and unbound or in solid solution. On the other hand, when the anatase form of titanium dioxide was used in the starting mixture with a suitable zinc compound, the zinc-titanium compounds in the product obtained upon heating the mixture were always of cubic symmetry and of spinel structure type. It was further shown that combination between $\gamma$-titanic acid and zinc oxide was effected more easily and at lower temperatures than with anatase and zinc oxide, and that the critical thermal temperatures at which solid solutions of titanium dioxide in the titanates were decomposed to form rutile were lower with $\gamma$-titanic acid. For equivalent ratios of $TiO_2$ to $ZnO$, and equivalent temperature and time of heating, the quantity of free titanium dioxide released as rutile by the heating of the solid solution is greater when $\gamma$-titanic acid is used as the source of $TiO_2$ in the starting mixture than when anatase is used. As a result, the products for the $\gamma$-titanic acid-$ZnO$ mixtures possess greater tinting strength and hiding power.

By the term "$\gamma$-titanic acid" as used both in this specification and the claims attached thereto, we mean that form of hydrous titanium oxide which may be obtained from a variety of procedures, such for instance, as that disclosed in McCord Patent 2,326,156, and which is characterized by properties of high degree of solubility in mineral acids, and of being directly convertible to rutile without the use of sintering agents or accelerating agents when calcined at temperatures of as low as 800 to 900° C., and particularly by possessing a characteristic crystalline structure in which the chemical constituents are so arranged in the lattice as to produce upon X-ray analysis a characteristic band pattern, the bands of which are spaced on a scale calibrated in Angstrom units to correspond to the positions of

| d/n (Å.) | I |
|---|---|
| 5.83 | 5 |
| 3.99 | 10 |
| 3.40 | 6 |
| 3.145 | 2.5 |
| 2.600 | 2.5 |
| 2.342 | 3.5 |
| 2.132 | 3.5 |
| 1.888 | 8.0 |
| 1.696 | 1.5 |
| 1.499 | 9.5 |
| 1.354 | 3.0 |
| 1.247 | 2.5 |
| 1.177 | 3.5 |
| 1.087 | 2.5 |
| 1.048 | 5.0 |
| 1.011 | 1.5 |
| 0.956 | 6.0 |
| 0.917 | 0.5 |
| 0.894 | 2.0 |
| 0.868 | 4.0 |
| 0.843 | 0.5 |
| 0.813 | 3.0 |
| 0.785 | 2.0 |
| 0.747 | 3.0 |
| 0.712 | 3.5 |
| 0.692 | 1 |
| 0.682 | 2.5 |
| 0.670 | 3.5 |
| 0.656 | 1 | where the $d/n$ values are the interplanar spacing and I is the relative visual intensity of the lines of the pattern.

$\gamma$-titanic acid is further characterized by containing adsorbed upon the surface of its particles a minor quantity of ions residual from the process of its preparation and not completely removable by washing. For example, in the $\gamma$-titanic acid obtained by precipitation from a solution of ammonium fluotitanate by contacting it with an excess of aqua ammonia, after thorough washing, a quantity of fluorine in the vicinity of 0.3 to .05%, and a quantity of $NH_3$ in the vicinity of 1-5%, calculated on the weight of $TiO_2$ present is ordinarily found. Similarly in $\gamma$-titanic acid precipitated from other mineral acid solutions of titanium by an alkali, a detectable amount of the mineral acid ion and the alkaline ion is present. Further, when a sulphuric acid solution of titanium is thermally hydrolyzed in the presence of $\gamma$-titanic acid as a nucleating agent, the precipate upon calcination is readily convertible to rutile by calcination at temperatures within the range of 800–900° C., whereas when an anatase modification is used for nucleation, only anatase is obtained by calcination of the precipitate.

The term "symmetry" and "structure types" are used in this specification and the claims attached thereto in the same sense that they are employed by Wyckoff. (Wyckoff, The Structure of Crystals, 2nd edition (1931).)

X-ray examination of the product discussed in this application was conducted in the same manner as described in our Patent No. 2,379,019.

The presence of either $TiO_2$ or metallic oxide in solid solution in a titanate produces changes of minute order in line position and/or intensities of the lines in the powder diffraction pattern of the pure titanate. As the quantity of oxide in solid solution in the titanate increases there is a progressive slight change in the position of the X-ray diffraction lines, and hence in the value of $a_0$ (dimension of the unit cell) because of distortion in the unit cell.

Our invention involves an entirely new magnesium-titanium-oxygen compound which is characterized by cubic symmetry, and of the sulvanite structure type, and which has highly desirable properties as a pigment in coating compositions. The empirical formula of the new compound may be written as $Ti_3(MgO_4)_2$, and corresponding to the general formula $M_3(YO_4)_x$ for compounds of cubic symmetry and of the sulvanite structure type, or as $3TiO_2 \cdot 2MgO$, including multiples of this proportion as indicated by $x(3TiO_2 \cdot 2MgO)$.

This new compound may be produced in a substantially pure state when a mol ratio of 1½ mol of $TiO_2$ to 1 mol of MgO is employed, or it may have embodied therein either $TiO_2$ or MgO in a free state and readily detectable in the X-ray pattern if the mol ratio be either greater or lesser than that above given. Furthermore, if the $TiO_2$ be in excess of said mol ratio, such excess of $TiO_2$ will be present as anatase or rutile, depending upon the temperature of calcination.

Beyond certain limits as to the excess of MgO, and above certain limits as to temperature, there may be present magnesium metatitanate, $MgTiO_3$, of hexagonal symmetry and associated with the cubic MgO—$TiO_2$ compound, or with free MgO.

As a further feature of our invention we have discovered a new process by which the magnesium-titanium-oxygen compound of cubic symmetry, and of the sulvanite structure type may be produced. As an important feature of our invention, a suitable magnesium compound is mixed with $\gamma$-titanic acid in the desired proportions, and heated to a temperature in excess of 450° C. The specific characteristics of the product may be varied by the selection of the relative proportions of the magnesium compound and the $\gamma$-titanic acid, and by the selection of the temperature to which the mixture is heated.

In the accompanying drawings:

Fig. 1 is a chart showing the X-ray diffraction powder patterns of different compounds herein referred to, and Fig. 2 shows the character of the products obtained by heating $\gamma$-titanic acid with a magnesium compound, and under different conditions as to mol ratio and temperature.

We have found that when various proportions of $\gamma$-titanic acid are mixed with magnesium oxide, or other suitable compounds of magnesium, such compounds being characterized as capable of yielding the oxide upon heating, combination is effected to form magnesium-titanium-oxygen compounds. This combination takes place at lower temperatures for a given time of heating, than with similar mixtures of $\gamma$-titanic acid and zinc oxide, although the rate of reaction is somewhat slower and a longer time of heating is required to stabilize the products and to develop pigmentary characteristics such as oil absorption, texture, hiding power, whiteness, brightness, etc., as compared to corresponding mixtures with zinc oxide. The products of reaction between $\gamma$-titanic acid and magnesium oxide are somewhat more chemically reactive than the zinc titanates, but the greater brightness and whiteness of the former is such as to warrant the substitution of magnesium for zinc where chemical reactivity is not too great a factor in the usage to which the pigment is to be put.

When $\gamma$-titanic acid is mixed with magnesium oxide, or other suitable magnesium compound, and the mixture heated, combination takes place at well below 600° C., and the material obtained, upon X-ray examination, produces a characteristic diffraction pattern consisting of lines in relative positions corresponding to interplanar spacings and such that when spaced upon a scale calibrated in Angstrom units, they correspond to positions of

| d/n (Å.) | I |
|---|---|
| 5.0 | 2 |
| 3.5 | 6 |
| 2.75 | 10 |
| 2.46 | 1 |
| 2.42 | 1 |
| 2.20 | 6 |
| 2.00 | 1 |
| 1.88 | 8 |
| 1.77 | 0.5 |
| 1.70 | 1 |
| 1.63 | 1 |
| 1.53 | 6 |
| 1.42 | 0.5 |
| 1.35 | 0.5 |
| 1.32 | 1 |

The interplanar spacings indicated by these lines relative to the interplanar spacings of other compounds described in this application are set forth in Fig. 1, and may be considered as those characteristic of a magnesium-titanium-oxygen compound of cubic symmetry and of the sulvanite structure type. (Wyckoff, The Structure of Crystals, 2nd edition, Sup. p. 71). (Frevel, Tabulated Diffraction Data for Cubic Isomorphs, Ind. & Eng. Chem. Anal. Ed., vol. 14, p. 687). Such structure has not hitherto been described for any titanium compound. We realize that the line listed at $d/n=5.0$ Å is unusual in the structure type and that the two lines $d/n=2.46$ Å and $d/n=2.42$ Å appear to be replacing a line which should for the type be found at about $d/n=2.44$ Å. These lines have, however, been found in all our patterns, but we believe that the line listed as $d/n$ A$=5.0$ and the line $d/n$ A$=2.46$ are not the lines of compounds of cubic symmetry and of the sulvanite structure type, but are the lines of a small amount of the compound TiMgO$_3$, due to a small amount of incomplete reaction. It will be noted that the five lines of the greatest brilliancy are those of $d/n$ A 3.5, 2.75, 2.20, 1.88 and 1.53. These lines correspond to the Miller indices 111, 210, 220, 311 and 400.

When the quantity of $\gamma$-titanic acid calculated as TiO$_2$ to magnesium compound calculated as MgO used in the starting mixture is in the ratio of 1.5 mol weight of TiO$_2$ to 1 mol weight of MgO, the diffraction patterns obtained upon the products of heating such mixture at between 450° C. and 1025° C. are those of the pure compound, that is, all the lines present in the diffraction patterns correspond to the magnesium-titanium compound described as being of cubic symmetry and of the sulvanite structure type, and accordingly the compound may be considered as having the empirical formula Ti$_3$(MgO$_4$)$_2$.

As seen from the sharpness of the zone at 1.5 mols of TiO$_2$ to 1 mol MgO, wherein patterns containing only lines of the cubic magnesium-titanium-oxygen compound are obtained, solid solutions of TiO$_2$ in the compound occur if at all only to a minor extent, nor is there any appreciable distortion observable in the pattern. This is quite unlike the relationship existing in the TiO$_2$—ZnO system as disclosed in our patent No. 2,379,019, wherein a considerable degree of solid solution could be easily determined. Since such changes may be of minute order, however, and undetectable in the present state of the art of radiography, we do not exclude the possibility of some degree of such solid solution existing in the TiO$_2$—MgO system, and we reserve the right to include such within the scope of our invention should such be found to exist by later improvement in the methods of examination.

As the proportion of TiO$_2$ to MgO increases above 1.5 mols of TiO$_2$ to each mol of MgO, lines characteristic of titanium dioxide appear in the diffraction pattern, associated with the lines of the MgO—TiO$_2$ compound. And at ratios of less than 1.5 mols of TiO$_2$ to each mol of MgO, lines characteristic of MgO are similarly associated. These relationships may be seen in the drawing, Fig. 2, which defines the zones of structure in terms of temperature and proportions of $\gamma$-titanic acid as TiO$_2$ to the magnesium compound as MgO.

It will be further observed from the diagram of Fig. 2, that the upper limit of temperature for the formation of products consisting only of a cubic magnesium-titanium-oxygen compound or of such compound associated with uncombined excess titanium dioxide or uncombined excess magnesium oxide is that at which the cubic structure is converted into the hexagonal magnesium metatitanate, MgTiO$_3$. Such transition is observable by means of the X-ray diffraction patterns and the temperature required for such transition is seen by the diagram to increase as the proportion of TiO$_2$ to MgO increases.

With proportions of $\gamma$-titanic acid to MgO greater than 1.5 mols TiO$_2$ to 1 mol of MgO, and after heating at temperatures between 450° C. and about 780° C., as in zone E, the excess TiO$_2$ in the mixture is present as anatase. At temperatures above about 780° C., as in zone A, the excess TiO$_2$ in the mixture is present as rutile. The powder diffraction patterns of these various mixtures show the characteristic lines of anatase or rutile in addition to the characteristic lines of the cubic magnesium-titanium-oxygen compound of the sulvanite structure type.

At proportions of more than about 5 mols of $\gamma$-titanic acid as TiO$_2$ to each mol of MgO, the products obtained upon heating above 780° C., and consisting of rutile associated with a relatively minor amount of cubic magnesium-titanium-oxygen compound, possess a hiding power equal to that usually found in pure rutile pigments, and an extremely high degree of whiteness and brightness. Above this limit of about 5 mols of TiO$_2$ to 1 mol of MgO, the amount of new magnesium-titanium-oxygen compound becomes so small in respect to the TiO$_2$ that it does not constitute any essential part, and does not impart to the product the desired characteristics. Throughout the range studied, extending up to 1100° C., all the products possessed excellent fineness and softness of texture, and other pigmentary properties, and were easily miscible with drying oils, varnish, lacquer, and other paint vehicles. About 1100° C. is the upper practical limit for the production of the new magnesium-titanium-oxygen compound.

With proportions between about 0.75 and 3.0 mols of $\gamma$-titanic acid to each mol weight of MgO, and temperatures between about 1025° C. and about 1100° C., as in zone B, the products produce powder diffraction patterns indicating mixtures of the cubic-magnesium-titanium-oxygen compound and hexagonal magnesium metatitanate of the ilmenite structure type.

At temperatures above those designated in the diagram of Fig. 2 as the transition temperature between the cubic compound and the hexagonal metatitanate, and which temperature increases as the proportion of TiO$_2$ to MgO increases, as shown by the dividing line between zone C and zone D. The product obtained by heating to such temperatures, mixtures of one or less mol of TiO₂ to γ-titanic acid to each mol MgO upon X-ray analysis, produce powder diffraction patterns characteristic of hexagonal magnesium metatitanate, MgTiO₃ of the ilmenite structure type, associated with more or less uncombined magnesium oxide. Below the temperature of 450° C. there is little or no reaction. Where the ratio of MgO to TiO₂ is in excess of 3 to 1 the amount of resulting Ti₃(MgO₄)₂ is relatively small and does not impart to the product the desired characteristics.

On account of the ease of producing highly pure magnesium-titanium-oxygen compounds, as well as for operative ease, we prefer to use as the magnesium compound for admixture with the γ-titanic acid, magnesium in the form of oxide, hydroxide, carbonate or basic carbonate, but we may employ any magnesium compound which produces an oxide upon heating or will combine with the titanium under the conditions of the reaction which we define as heating together with γ-titanic acid at temperatures above 450° C. Such suitable compounds also include in addition to the oxide, hydroxide, carbonate and basic carbonate, the sulphate and other mineral acid salts and the acetate and other organic acid salts of magnesium, and any of these or a mixture of them is included in our definition "a suitable magnesium compound."

In preparing our starting mixture we prefer to add the calculated quantity of the magnesium compound into an aqueous slurry of γ-titanic acid, but dried γ-titanic acid may be employed and the components well incorporated by mixing. Or, if the magnesium compound employed is water-soluble, it may be dissolved in water prior to its addition to the γ-titanic acid. The magnesium compounds may be added to either of the reagents used for precipitating the γ-titanic acid and then precipitated together with it. As an example of this procedure, the magnesium compound may be added to a solution of ammonium fluotitanate, and the γ-titanic acid together with a magnesium compound then precipitated by addition of an excess of aqua ammonia.

In the preferred practice of our invention we add to an aqueous slurry of γ-titanic acid the requisite proportion of basic magnesium carbonate to give a ratio of TiO₂ to MgO indicated by Fig. 2 for obtaining a product of the desired crystalline structure. Thorough agitation is given to insure an intimate mix.

The slurry may then be passed over a filter to partially dehydrate and the thick slurry thus obtained fed to a calcining apparatus. Drying prior to calcining may be employed if desired. The calciner is preferably of the rotary type, but any other means of heating may be employed. If a rotary calciner is employed, the speed of rotation of the calciner is set to provide a fixed time of about 2 to 4 hours in the effective calcination zone, and the temperature at the discharge end of the calciner set at a point selected as within a zone defined in Fig. 2 for the desired crystal form. Samples are withdrawn from the furnace and examined radiographically and the oil absorption measured. If the oil absorption is undesirably low the temperature is adjusted downward, and if the oil absorption is undesirably high the temperature may be raised to any point within the zone, as shown in the diagram. Incomplete transition to the desired form may then be corrected by changing the speed of the calciner which in turn regulates the time within the effective zone, longer time being required if the transition desired is incomplete. As an example of this method for determining calcination conditions, if it is desired to obtain a material of low oil absorption, high hiding and whiteness, and consisting of rutile associated with a minor amount of a cubic magnesium-titanium-oxygen compound, a proportion of γ-titanic acid equivalent to say 10 to 20 mols of γ-titanic acid calculated as TiO₂ to 1 mol of MgO as basic magnesium carbonate may be taken and well mixed together. The slurry may be then partially dehydrated on a filter and fed to a rotary calciner at a fixed speed of rotation calculated to produce a time period of 3 hours in the effective zone, the temperature at the discharge end being set at 975° C. A sample of the discharge is submitted to oil absorption tests and the temperature adjusted in the manner described until the discharge is within the desired range of oil absorption. The X-ray diffraction pattern should then show no line other than those characteristic of rutile and of cubic magnesium-titanium-oxygen compound of the sulvanite structure type, but if anatase lines should be found in the pattern the speed of rotation of the calciner would be reduced progressively until such lines are no longer found.

Under similar treatment conditions, with proportion of 1.5 mols of TiO₂ as γ-titanic acid to each mol of MgO, the product obtained would be substantially only the cubic magnesium-titanium-oxygen compound of the sulvanite structure type. At proportions of more than 1.5 mols TiO₂ to 1 mol of MgO the product consists of rutile associated with the cubic magnesium-titanium-oxygen compound, and at proportions of less than 1.5 mols of TiO₂ to 1 mol MgO, of either the hexagonal metatitanate or the cubic or the magnesium-titanium-oxygen compounds associated with magnesium oxide, depending upon the proportion and temperature employed, and as shown in Fig. 2.

It will be understood that the dividing lines between the zones A, B, C, D and E do not in all cases represent sharp and clean-cut divisions between the types of compounds indicated. For instance, adjacent to the line between the zones A and E and the zone D, there may be a small amount of MgO in the cubic compound formed from a little more than 1½ mols of TiO₂ for each mol of MgO, and there may be small amounts of rutile or anatase in the cubic compound formed from a little less than 1½ mols of TiO₂ for each mol of MgO. Also there may be a small amount of anatase in the lower part of zone A and a small amount of rutile in the upper part of the zone E.

Having thus described our invention, what we claim as new and desire to secure by Letters Patent is:

1. The process of making a white pigmentary material having as an essential ingredient a magnesium-titanium-oxygen compound having the empirical formula 3TiO₂.2MgO, characterized by possessing a crystalline structure which upon X-ray analysis produces a diffraction pattern typical of a crystalline compound of cubic symmetry and of sulvanite structure, said process comprising mixing together γ-titanic acid and a magnesium compound in the ratio of 1 mol of said magnesium compound calculated as MgO, to at least ⅓ mol and not to exceed 4.5 mols of γ-titanic acid calculated as TiO₂, and heating the mixture to a temperature between 450° C. and 1100° C., said magnesium compound being selected from the group consisting of magnesium compounds which will form magnesium oxide and those which will combine with titanium oxide at said temperature.

2. The process of making a white pigmentary material having as an essential ingredient a magnesium-titanium-oxygen compound having the empirical formula 3TiO₂.2MgO, characterized by possessing a crystalline structure which upon X-ray analysis produces a diffraction pattern typical of a crystalline compound of cubic symmetry and of sulvanite structure, said process comprising mixing together γ-titanic acid and a magnesium compound in the proportions of about 1.5 mols of γ-titanic acid calculated as TiO₂ to each mol of the magnesium compound calculated as MgO and heating to a temperature between 450° C. and 1100° C., said magnesium compound being selected from the group consisting of magnesium compounds which will form magnesium oxide and those which will combine with titanium oxide at said temperature.

3. The process of making a white pigmentary material having as an essential ingredient a magnesium-titanium-oxygen compound having the empirical formula 3TiO₂.2MgO, characterized by possessing a crystalline structure which upon X-ray analysis produces a diffraction pattern typical of a crystalline compound of cubic symmetry and of sulvanite structure, said process comprising mixing together γ-titanic acid and a magnesium compound in the ratio of at least about ⅓ mol and not over about 4.5 mols of γ-titanic acid calculated as TiO₂ to 1 mol of the magnesium compound calculated as MgO, and heating the mixture to a temperature between 450° C. and 1025° C., said magnesium compound being selected from the group consisting of magnesium compounds which will form magnesium oxide and those which will combine with titanium oxide at said temperature.

4. The process of forming a white pigmentary material having the empirical formula

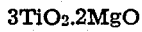

3TiO₂.2MgO which comprises heating together a mixture of γ-titanic acid and a magnesium compound, in proportions of about 1.5 mols of γ-titanic acid calculated as TiO₂ to each mol of the magnesium compound calculated as MgO at a temperature of between 450° C. and 1025° C., until an X-ray diffraction pattern of the material contains substantially only lines in relative positions corresponding to interplanar spacing of 5.0, 3.5, 2.75, 2.46, 2.42, 2.20, 1.88, 1.77, 1.70, 1.63, 1.53, 1.42, 1.35 and 1.32 Angstrom units and heating to a temperature between 450° C and 1100° C., said magnesium compound being selected from the group consisting of magnesium compounds which will form magnesium oxide and those which will combine with titanium oxide at said temperature.

5. The process of forming a white pigmentary material having as an essential ingredient a crystalline magnesium-titanium-oxygen compound having the empirical formula 3TiO₂·2MgO of cubic symmetry and of the sulvanite structure type, which process consists in heating a mixture of γ-titanic acid and a magnesium compound in the proportions of about 1.5 mols of γ-titanic acid calculated as TiO₂ to each mol of magnesium compound calculated as MgO, said heating being to a temperature of between 450° C. and 1025° C., said magnesium compound being selected from the group consisting of magnesium compounds which will form magnesium oxide and those which will combine with titanium oxide at said temperature.

6. The process of forming a white pigmentary material consisting of titanium dioxide associated with a magnesium-titanium-oxygen compound having the empirical formula 3TiO₂·2MgO of cubic symmetry and of the sulvanite structure type, which consists in mixing together γ-titanic acid and a magnesium compound, and in the proportions of more than 1.5 and not to exceed about 4.5 mols of γ-titanic acid calculated as TiO₂ to each mol of the magnesium compound calculated as MgO, and heating said mixture to a temperature between 450° C. and 1025° C. until an X-ray diffraction pattern of the material shows substantially only those lines which are characteristic of a titanium dioxide and of a magnesium titanium compound of cubic symmetry, and of the sulvanite structure type, said magnesium compound being selected from the group consisting of magnesium compounds which will form magnesium oxide and those which will combine with titanium oxide at said temperature.

7. The process of forming a white pigmentary material consisting of rutile associated with a magnesium-titanium-oxygen compound having the empirical formula 3TiO₂·2MgO of cubic symmetry and of the sulvanite structure type, which consists in mixing together γ-titanic acid and a magnesium compound, and in proportions of more than 1.5 and not to exceed 4.5 mols of γ-titanic acid calculated as TiO₂ to each mol of the magnesium compound calculated as MgO, and heating said mixture to a temperature between about 780° C. and about 1100° C. until an X-ray diffraction pattern of the material shows substantially only those lines which are characteristic of titanium dioxide in the rutile modification and of a magnesium-titanium-oxygen compound of cubic symmetry and of the sulvanite structure type, said magnesium compound being selected from the group consisting of magnesium compounds which will form magnesium oxide and those which will combine with titanium oxide at said temperature.

8. The process of forming a white pigmentary material consisting of rutile associated with a magnesium-titanium-oxygen compound having the empirical formula 3TiO₂·2MgO of cubic symmetry and of the sulvanite structure type, which consists in mixing together γ-titanic acid and a magnesium compound, and in proportions of more than 1.5 and not to exceed about 4.5 mols of γ-titanic acid calculated as TiO₂ to each mol of the magnesium compound calculated as MgO, and heating said mixture above 780° and below that at which hexagonal magnesium titanate would form and until the mixture is converted into rutile associated with a magnesium-titanium-oxygen compound of cubic symmetry and of the sulvanite structure type, said magnesium compound being selected from the group consisting of magnesium compounds which will form magnesium oxide and those which will combine with titanium oxide at said temperature.

9. The process of forming a white pigmentary material which comprises heating a mixture of γ-titanic acid with a magnesium compound, in a proportion of between about 0.75 to 3 mols of γ-titanic acid calculated as TiO₂ to each mol of the magnesium compound calculated as MgO, at a temperature between about 1025° C. and about 1100° C. until said mixture is converted into a mixture of hexagonal magnesium titanate of the ilmenite structure type and a cubic magnesium-titanium-oxygen compound having the empirical formula $3TiO_2 \cdot 2MgO$ of the sulvanite structure type, said magnesium compound being selected from the group consisting of magnesium compounds which will form magnesium oxide and those which will combine with titanium oxide at said temperature.

10. The process of forming a white pigmentary material having the empirical formula $$3TiO_2 \cdot 2MgO$$

which consists in heating together a mixture of γ-titanic acid and a magnesium compound, in a proportion of more than 1.5 and not to exceed about 4.5 mols of γ-titanic acid calculated as $TiO_2$ to each mol of the magnesium compound calculated as MgO, and at a temperature between about 450° C. and about 780° C., until an X-ray diffraction pattern of the material shows substantially only those lines which are characteristic of titanium dioxide in the anatase form, together with lines due to a magnesium-titanium-oxygen compound having the empirical formula $3TiO_2 \cdot 2MgO$ of cubic symmetry and of the sulvanite structure type, said magnesium compound being selected from the group consisting of magnesium compounds which will form magnesium oxide and those which will combine with titanium oxide at said temperature.

11. A white pigmentary material which includes as an essential ingredient titanium oxide associated with a magnesium-titanium-oxygen compound having the empirical formula $$3TiO_2 \cdot 2MgO$$

of cubic symmetry and of the sulvanite structure type, and identical with that produced by the process of claim 1.

12. A white pigmentary material which consists of titanium dioxide in the rutile form associated with a magnesium-titanium-oxygen compound having the empirical formula $3TiO_2 \cdot 2MgO$ of cubic symmetry and of the sulvanite structure type, and identical with that produced by the process of claim 7.

13. A white pigmentary material which consists of titanium dioxide in the anatase form associated with a magnesium-titanium-oxygen compound having the empirical formula $$3TiO_2 \cdot 2MgO$$

of cubic symmetry and of the sulvanite structure type, and identical with that produced by the process of claim 12.

14. A white pigmentary material which consists of a magnesium-titanium-oxygen compound having the empirical formula $3TiO_2 \cdot 2MgO$ of cubic symmetry and of the sulvanite structure type, associated with a compound selected from the group consisting of titanium dioxide in the rutile form, titanium dioxide in the anatase form, magnesium oxide and magnesium metatitanate, and identical with that produced by the process of claim 1.

15. A white pigmentary material consisting of magnesium metatitanate of the ilmenite structure type associated with a magnesium-titanium-oxygen compound having the empirical formula $3TiO_2 \cdot 2MgO$ of cubic symmetry and the sulvanite structure type, and identical with that produced by the process of claim 9.

16. A white pigmentary material containing as an essential ingredient a crystalline compound of titanium, magnesium and oxygen, having the empirical formula $3TiO_2 \cdot 2MgO$, and having a lattice structure in which said elements are so arranged as to substantially conform to the following X-ray pattern:

| $d/n$ (Å.) | Intensity |
|---|---|
| 5.0 | 2 |
| 3.5 | 6 |
| 2.75 | 10 |
| 2.46 | 1 |
| 2.42 | 1 |
| 2.20 | 6 |
| 2.00 | 1 |
| 1.88 | 8 |
| 1.77 | 0.5 |
| 1.70 | 1 |
| 1.63 | 1 |
| 1.53 | 6 |
| 1.42 | 0.5 |
| 1.35 | 0.5 |
| 1.32 | 1 | where the $d/n$ values are the interplanar spacing measured in Angstrom units, and Intensity is the relative visual intensity of the lines of the pattern.

ANDREW T. McCORD.
HAROLD F. SAUNDERS.